United States Patent

Nadin et al.

[11] 4,389,143
[45] Jun. 21, 1983

[54] METHOD OF UNPLUGGING DENSE CONVEYING SYSTEM

[75] Inventors: Robert P. Nadin, Wharton, N.J.; Jannan G. Lee, Houston, Tex.

[73] Assignee: Union Carbide Corporation, Danbury, Conn.

[21] Appl. No.: 244,528

[22] Filed: Mar. 16, 1981

[51] Int. Cl.³ .................................................. B65G 53/16
[52] U.S. Cl. .................................. 406/197; 406/45; 406/95
[58] Field of Search ............... 406/45, 95, 94, 93, 406/197

[56] References Cited

U.S. PATENT DOCUMENTS

| | | | |
|---|---|---|---|
| 2,897,005 | 7/1959 | Wiltse | 406/95 |
| 3,929,379 | 12/1975 | Krambrock | 406/95 |
| 4,067,622 | 1/1978 | Krambrock et al. | 406/94 X |
| 4,171,925 | 10/1979 | Krambrock | 406/95 |

OTHER PUBLICATIONS

The South African Mechanical Engineer-vol. 25; Dec. 1975-p. 395, described in Pneumotransport 3, Third International Conference on the Pneumatic Transport of Solids in Pipes, Apr. 7th-9th, 1976 and is entitled Latest Developments and Applications of High Density Pneumatic Conveying Systems, by W. Flatt-Buhler Brothers Ltd., Switzerland.

Primary Examiner—John J. Love
Assistant Examiner—L. E. Williams
Attorney, Agent, or Firm—Clement J. Vicari

[57] ABSTRACT

The plugging of fluidized solids in long transfer lines is a particularly troublesome problem from an operational standpoint. Obstructions are cleared by closing off the transfer line at both ends, introducing an inert (non-deleterious) gas into the conduit at a few atmospheres pressure above the pressure at the conduit output, maintaining the gas pressure for a time to allow pressure equilization along the conduit, and thereafter opening the conduit outlet to permit the plugged solids to refluidize and then clear the line.

8 Claims, 1 Drawing Figure

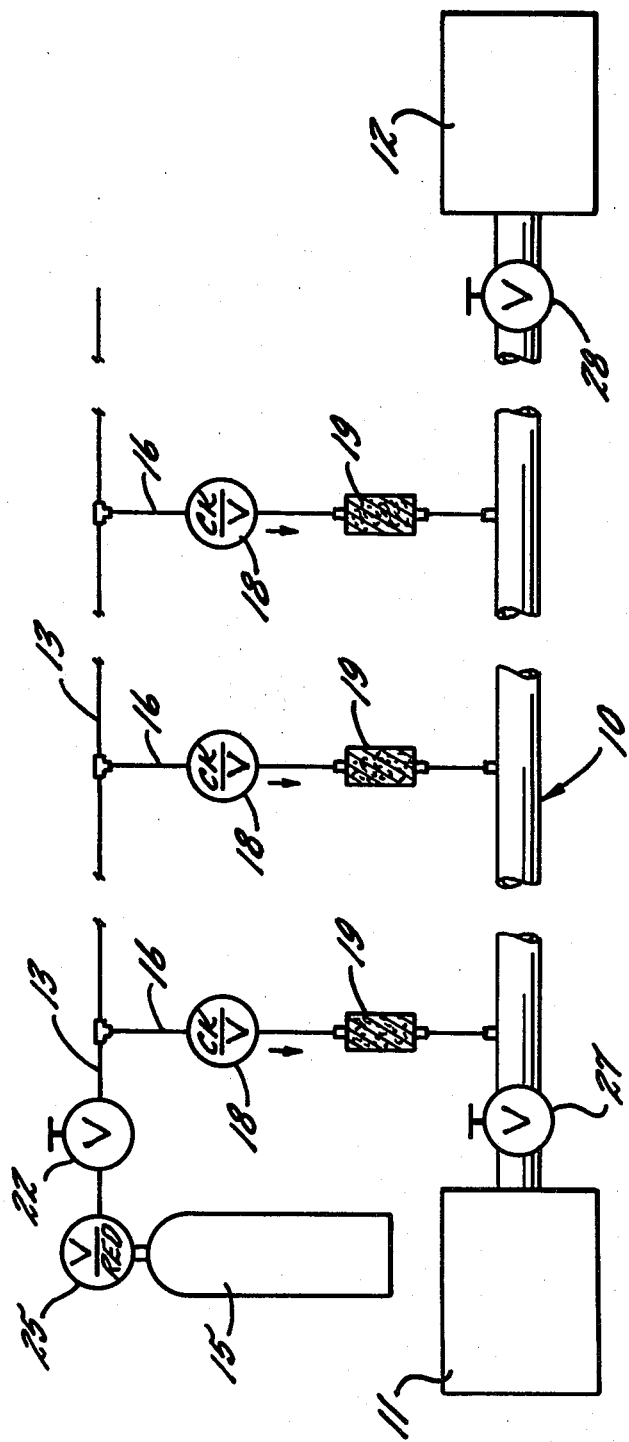

METHOD OF UNPLUGGING DENSE CONVEYING SYSTEM

BACKGROUND OF THE INVENTION

This invention relates to a method of unplugging fluidized solids transfer conduits. More particularly, it provides a method of readily re-fluidizing compacted solids plug which occasionally form in such conduits as a result of episodic flow or pressure disruptions.

The use of fluidization as a technique for contacting gases with solids, or for conveying solids, is widely practiced. See "Fluidization," in Kirk-Othmer's "Encyclopedia of Chemical Technology," Second Edition, Vol. 9, pp. 398 et seq. The various advantages of the technique are well known and widely availed of.

In chemical processing plants using fluidization, either as a contact technique or simply for solids transfer, a particularly aggravating situation occasionally occurs. The solids, as a powder or as granular materials, are typically suspended in a fluidizing gas stream and then conveyed through elongated transfer pipes or conduits. The solids flow, however is vulnerable to occasional disruptions in pressure, flow rate, solids concentration, or the like. When this occurs, the solids de-fluidize, and form a flow-obstructing, relatively compact, solid plug in the pipe or conduit. Because of the high solids content of the fluidized stream, the plug rapidly fills a substantial portion of the conduit, making it impervious to further solids flow, and, at times, to further gas flow.

When a pipe or conduit of this type becomes plugged, unplugging is more than merely troublesome. Sometimes it is necessary to disconnect the transfer conduit entirely, disassemble it into relatively short sections, and clean out each section separately. Alternatively, proposals have been made for having gas pressure taps every few score feet or so along the conduit, closing off the conduit inlet end, and sequentially blasting out solids by injecting gas from tap to tap, beginning near the outlet end.

Neither technique has been found acceptable. Both are time consuming, troublesome, not always effective, environmentally undesirable, or even hazardous. When, as is often the case, the solids are catalytically active, contact with air, moisture, or the like may inactivate the catalyst. In some processes, the solids are pyrophoric, and therefore combustible. Moreover, the lengthy time delays necessary to unplug the transfer lines, with concurrent termination of all flow during the unplugging period, can result in major plant shutdowns.

An especially serious situation occurs in catalytic processes where the catalyst is prepared at a location remote from the reactor. Here the transfer conduit may be several hundred or even several thousand feet in length, and of relatively small diameter, e.g., one inch pipe. Unplugging a one inch pipe several thousand feet long, which may include bends, may consume many hours or even days. Since the catalyst must be supplied to the reactor continuously, a plugged transfer line, to all intents and purposes, means a shut-down in the processing reactor.

Accordingly, an object of the invention is to provide a method for unplugging the elongated transfer pipes or conduits used in conveying fluidized powder or granular solid from a high pressure zone or area to a relatively lower pressure zone, which method is economical to install, convenient to use, and remarkably rapid and effective to operate.

SUMMARY

Briefly, in accordance with the invention, long transfer conduits used in conveying fluidized solids from a high pressure zone to a lower pressure zone, which conduits are susceptible to occasional disruptions resulting in the formation of a flow-obstructing compacted solids plug throughout a substantial portion of the conduit, are unplugged by the following sequence.

First, the transfer conduit is closed off at or near the high pressure conduit inlet, and at or near the lower pressure conduit outlet.

Second, an inert (non-deleterious) gas is introduced into the conduit, at relatively widely spaced points (e.g., 20–150 feet apart) along the conduit, at a slight pressure above the pressure of the outlet or lower pressure zone.- (e.g., a pressure from about several psi to a few atmospheres pressure, advantageously about 20–40 lbs. per square inch, is effective.)

Third, the inert gas introduction is maintained at the above pressure for a substantial time, sufficient for the pressure to substantially equalize along the entire conduit. Usually the time is in excess of about 10 minutes or so, with 30 minutes adequate for most purposes.

Fourth and finally, the conduit is opened into the lower pressure zone to permit the conduit-plugging compacted solids to re-fluidize and then to flow into the lower pressure zone. After this, the conduit inlet may be opened, and the conduit is then again on stream.

DESCRIPTION OF THE PREFERRED EMBODIMENT

Although the method of the present invention is applicable to a wide range of fluidized powder or granular solids, ranging from fluidized catalysts having particle sizes predominantly within the range of 10–200 microns, through polyolefin granules having particle sizes predominantly in the 75–2,000 micron range, up through much larger solids, the method of the invention is especially applicable to the unplugging of transfer lines or conduits used in connection with handling fluidized particulate catalysts. Many processes are set forth in the previously cited Kirk-Othmer's reference; the method was developed especially for use with the fluidized bed UNIPOL process, as generally described in, for example, U.S. Pat. Nos. 3,779,712 and 4,243,619.

BRIEF DESCRIPTION OF THE DRAWING

The sole FIGURE in the drawing is a schematic generally illustrating one embodiment of the invention.

A typical UNIPOL pilot plant has a catalyst transfer line 10, that is, a conduit from the catalyst preparation unit to the polymerization reactor, approximately 300 feet in length, made up of one inch schedule 40 pipe. The commercial counterpart has a transfer line 1700 feet in length of the same size.

Conditions for forming a dense fluidized gas-solids stream are well known, and depend on solids density, particle size, gas velocity, and the like. In essence, however, the powder or granular solids are conveyed as a dense gas-solids suspension in a transfer gas.

The dimensions of the transfer line or conduit 10, together with the pressure differential used for the conveying, will vary with the solids process, the available pressures, the distance involved, and the like. When solid catalysts are employed for the UNIPOL process, the catalyst has a silica base with particle size range typically 10–200 microns. In a 1700 foot transfer line 10 made of one inch schedule 40 pipe, the inlet pressure at a blow tank 11 is about 80 psig, and the outlet at a surge bin 12 about 2–5 psi above ambient. Under these conditions, about 1,000–2,000 lbs. per hour of catalyst is conveyed, at a transfer gas rate of about 100 actual cubic feet per minute, measured at the inlet conditions.

The transfer line 10, as noted earlier, is one inch schedule 40 pipe. Positioned above the conduit, and extending over most of its length, is an inert gas introduction header line 13, conveniently ⅜ inch tubing. This is supplied with an inert gas, conveniently dry nitrogen gas from a tank 15.

The gas pressure of the header is quite important from the standpoint of optimum operation of the unplugging method. If the pressure is too high relative to the transfer conduit pressure, introduction of inlet gas into the transfer conduit may either sandblast the conduit walls or else may actually aggravate the compaction of a solids plug in the transfer conduit. On the other hand, if it is too low, the unplugging method simply requires too long a time.

It has been found, on the basis of experimentation, that an inert gas pressure from about one to a few atmospheres above the pressure of the outlet 12 of the conduit is desirable, with a more convenient pressure at about 20–40 psi above the outlet. Optimally, a 25–30 psig pressure is used with an atmospheric ambient, although good results have been achieved at 22 psig.

Extending from the inert gas header 13 to the transfer conduit, at widely spaced intervals, are a series of inert gas introduction taps 16. These taps may be, for example, 30–150 feet apart, but approximately 80 feet seems optimum from an economic standpoint. Taps more closely spaced permit the more rapid conduct of the deplugging method, but, of course, at a higher installation cost.

Either of two systems may be employed for connecting the inert gas header to the fluidized solids transfer conduit. For one, a communicating line equipped with a manually or automatically opened valve may be employed. For the other, which is significantly more convenient for long transfer conduits, a check valve 18, followed by a filter 20, leads from the header to the transfer line or conduit. In this latter case, a master valve 22 on the inert gas header 13, at one location, simultaneously introduces inert gas into each of the introduction points along the transfer conduit. The former, less preferred, method requires individual tap valve opening, and is inconvenient for relatively long transfer lines.

In operation, it is expected that a fluidized solids transfer line or conduit 10 will permit continuous transfer of the fluidized solids from the high pressure conduit inlet 11 to the low pressure conduit outlet or discharge 12. So long as the process is continuous, and there are no distruptions, there should be a continuous flow of fluidized solids.

Unfortunately a continuous flow cannot be assured. If there are any flow or pressure disruptions, or incorrect transfer valve operations, the fluidized solids de-fluidize in the transfer line. They form a flow-obstructing, relatively compact, almost impervious, solids plug, which usually extends over a substantial portion of the transfer conduit 10. Heretofore, when this has occurred, it has been necessary to close off the conduit inlet and, using closely spaced (e.g., 20–60 feet apart) gas inlet ports or taps, introduce fairly high pressure inert gas to blow out the conduit, beginning from the tap closest to the outlet and progressing sequentially upstream. In extreme situations, it has been necessary to disassemble the entire transfer conduit.

According to the invention, when an occasional disruption occurs to plug the transfer conduit, the unplugging method is put into operation. First, the conduit block valves 27, 28 are closed off.

The inert gas header 13 is placed into operation. The header is normally supplied with dry nitrogen gas from a main 15 at, for example, 90–100 psig, fed through a pressure regulator 25 to reduce the pressure to, say, 22 psig for introduction into the header. When the nitrogen is introduced, it is sent simultaneously through all of the remotely spaced points 16 along the conduit 10, where it enters the plugged conduit.

Nitrogen gas introduction is maintained for a rather substantial time, sufficient for the pressure to equalize itself along the entire conduit. This is important, normally, it requires at least about 10 minutes or so to equilibrate the pressure in a transfer line 10 of several hundred feet in length or more, but the time may vary considerably. A time in the range of about 20–40 minutes, advantageously about 30 minutes, is convenient where the distribution taps are spaced 20–150 feet or so apart. At the end of this time, the gas pressure has substantially equalized along the entire transfer conduit.

Thereafter, the block valve 28 near the conduit discharge, or lower pressure end, is opened to permit the plugged solids to re-fluidize and then flow or discharge out of the transfer conduit into the relatively lower pressure outlet zone 12. It is desirable at this stage that inert gas introduction be maintained for a few minutes so as to purge the transfer conduit of all solids.

Once the conduit is cleared, it is then possible to open the inlet block valve 27 and re-establish the main flow of fluidized solids to the conduit. Either then or previously, inert gas introduction is terminated.

Although the invention has been described in conjunction with fluidized solids for a particular process, where the near-pyrophoric character of the catalyst make transfer line disassembly both hazardous and inconvenient, and where transfer lines of several hundred or even several thousand feet in length are encountered, it is of advantage in a variety of other situations. In the same plant, for example, the polyolefin product is a granular solid, predominantly within a size range of 75–2,000 microns. Transfer of these relatively large solids can be conveniently accomplished in a fluidized system, where the method of the invention provides assurance against production stoppage.

While the invention has been described in conjunction with the above specific processes, variations and modifications will be apparent to those skilled in the art in light of the foregoing description. Accordingly, it is intended to embrace all such modifications, variations, and alternatives as they fall within the spirit and broad scope of the appended claims.

We claim:

1. In a method of conveying fluidized powder or granular solids, while suspended in a fluidizing gas stream, through an elongated transfer conduit from a high pressure zone to a relatively lower pressure zone, and wherein disruptions occasionally cause said solids to de-fluidize and thereby form a flow-obstructing relatively compact solids plug in a substantial portion of said conduit, the method of unplugging said transfer conduit which comprises:
(a) closing off said transfer conduit near the high pressure zone and near the lower pressure zone,
(b) introducing an inert (non-deleterious) gas into said transfer conduit at relatively widely spaced points along said transfer conduit, at a pressure from about several psi to a few atmospheres pressure above the pressure of the relatively lower pressure zone,
(c) maintaining said inert gas introduction at said pressure for a substantial time, sufficient for said pressure to substantially equalize along said conduit, and
(d) thereafter opening said conduit into the lower pressure zone to permit said conduit-plugging compacted solids to re-fluidize and then flow into said relatively lower pressure zone.

2. Method of claim 1 wherein said solids are a fluidized granular solids having a particle size predominantly within the range of 10-200 microns.

3. Method of claim 1 wherein said solids are polyolefin granules having a particle size predominantly within the range of 75-2,000 microns.

4. Method of claim 1 wherein said inert gas is introduced from an inert gas header conduit via a plurality of distribution conduits spaced about 20-150 feet apart.

5. Method of claim 1 wherein said pressure is about 20-40 psi above the pressure of the relatively lower pressure zone.

6. Method of claim 5 wherein said pressure is about 25-30 psi above the pressure of said relatively lower pressure zone.

7. Method of claim 1 wherein said time is at least about 10 minutes.

8. Method of claim 7 wherein said time is within a range of about 20-40 minutes.

* * * * *